United States Patent
Park et al.

(10) Patent No.: US 10,371,880 B2
(45) Date of Patent: Aug. 6, 2019

(54) DISPLAY DEVICE AND METHOD FOR FABRICATING THE SAME

(71) Applicant: SAMSUNG DISPLAY CO., LTD., Yongin-si, Gyeonggi-do (KR)

(72) Inventors: Chan-jae Park, Suwon-si (KR); Taeho Lee, Hwaseong-si (KR); Hyun-hwa Song, Hwaseong-si (KR); Seunghwan Baek, Seoul (KR)

(73) Assignee: SAMSUNG DISPLAY CO., LTD., Yongin-si, Gyeonggi-do (KR)

( * ) Notice: Subject to any disclaimer, the term of this patent is extended or adjusted under 35 U.S.C. 154(b) by 0 days.

(21) Appl. No.: 15/463,004

(22) Filed: Mar. 20, 2017

(65) Prior Publication Data
US 2017/0276854 A1   Sep. 28, 2017

(30) Foreign Application Priority Data
Mar. 24, 2016   (KR) ........................ 10-2016-0035463

(51) Int. Cl.
F21V 8/00   (2006.01)

(52) U.S. Cl.
CPC ........... G02B 6/005 (2013.01); G02B 6/0026 (2013.01); G02B 6/0051 (2013.01); G02B 6/0056 (2013.01); G02B 6/0083 (2013.01); Y02B 20/36 (2013.01)

(58) Field of Classification Search
CPC .... G02B 6/005; G02B 6/0083; G02B 6/0056; G02B 6/0026; G02B 6/0051
See application file for complete search history.

(56) References Cited

U.S. PATENT DOCUMENTS

| | | | | |
|---|---|---|---|---|
| 2013/0135558 | A1* | 5/2013 | Kim | G02F 1/133528 349/62 |
| 2014/0362556 | A1* | 12/2014 | Cho | B32B 3/30 362/19 |
| 2016/0097889 | A1* | 4/2016 | Kim | G02B 6/005 362/607 |
| 2016/0201858 | A1* | 7/2016 | Kang | G02B 6/005 349/71 |
| 2017/0052307 | A1* | 2/2017 | Yang | G02B 6/0056 |
| 2017/0123139 | A1* | 5/2017 | Huang | G02B 6/0053 |

FOREIGN PATENT DOCUMENTS

| | | |
|---|---|---|
| KR | 10-2012-0105953 | 9/2012 |
| KR | 10-2013-0046495 | 5/2013 |
| KR | 10-2013-0060473 | 6/2013 |
| KR | 10-2013-0120486 | 11/2013 |
| KR | 10-2014-0144571 | 12/2014 |
| KR | 10-2015-0033927 | 4/2015 |
| WO | 2012064562 | 5/2012 |

\* cited by examiner

*Primary Examiner* — Kevin Quarterman
(74) *Attorney, Agent, or Firm* — F. Chau & Associates, LLC

(57) ABSTRACT

A display device includes a backlight unit and a display panel disposed on the backlight unit. The backlight unit includes a light source unit and an optical unit disposed between the light source unit and the display panel. The optical unit includes an alignment layer, quantum rods disposed on the alignment layer, and an accommodation part configured to accommodate the alignment layer and the quantum rods.

15 Claims, 20 Drawing Sheets

DISPLAY DEVICE AND METHOD FOR FABRICATING THE SAME

CROSS-REFERENCE TO RELATED APPLICATION

This application claims priority under 35 U.S.C. § 119 to Korean Patent Application No. 10-2016-0035463, filed on Mar. 24, 2016, in the Korean Intellectual Property Office, the disclosure of which is incorporated by reference herein in its entirety.

TECHNICAL FIELD

The present invention relates to a display device and a method for fabricating the same, and more particularly, to a display device that is slim and displays a high quality image and a method for fabricating the same.

DISCUSSION OF THE RELATED ART

Examples of display devices that are well-known in recent years include liquid crystal display devices (LCDs), plasma display devices (PDPs), organic light emitting display devices (OLEDs), field effect display device (FEDs), electrophoretic displays (EPDs), and the like.

Since an LCD is not a self-luminous display device, the LCD includes a non-emission display panel that requires a separate light source. Recently, to increase the color reproduction quality of the liquid crystal display, technology that uses a wavelength conversion member such as a phosphor, a quantum dot, and a quantum rod has been considered.

SUMMARY

According to an exemplary embodiment of the present invention, a display device includes a backlight unit and a display panel disposed on the backlight unit. The backlight unit includes a light source unit and an optical unit disposed between the light source unit and the display panel. The optical unit includes an alignment layer, quantum rods disposed on the alignment layer, and an accommodation part configured to accommodate the alignment layer and the quantum rods.

According to an exemplary embodiment of the present invention, a method for fabricating a display device includes preparing a backlight unit and providing a display panel on the backlight unit. The preparing of the backlight unit includes preparing a light source unit, and providing an optical unit between the light source unit and the display panel. The providing of the optical unit includes preparing an accommodation part, providing an alignment layer in the accommodation part, and aligning quantum dots on the alignment layer.

According to an exemplary embodiment of the present invention, a display device includes a backlight unit and a display panel disposed on the backlight unit. The backlight unit includes a light source unit and an optical unit disposed between the light source unit and the display panel. The optical unit includes an alignment layer having grooves extending in a first direction, wherein the grooves are separated from each other in a second direction crossing the first direction, quantum rods disposed on the grooves, and accommodation part storing the alignment layer and the quantum rods.

BRIEF DESCRIPTION OF THE DRAWINGS

The above and other features of the present invention will become more apparent by describing in detail exemplary embodiments thereof in conjunction with the accompanying drawings, in which.

DETAILED DESCRIPTION OF THE EMBODIMENTS

Figure 1:
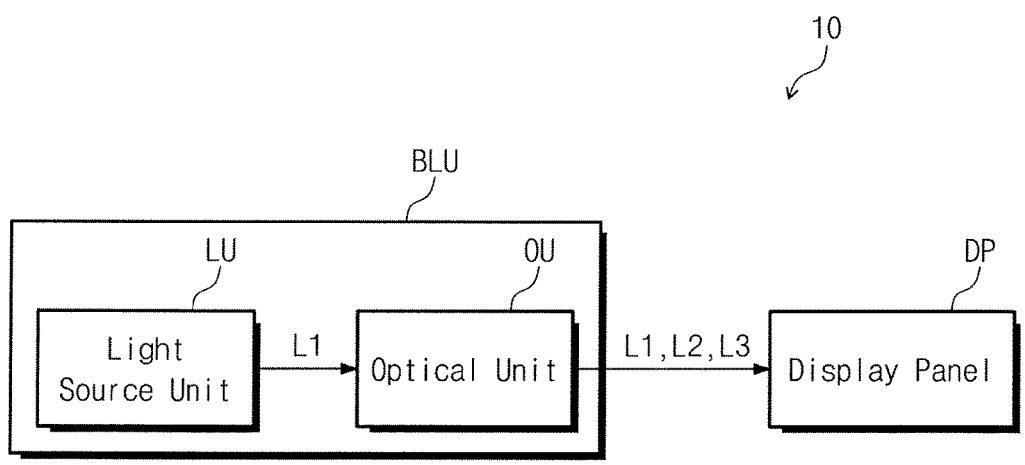
FIG. 1 is a block diagram of a display device according to an exemplary embodiment of the present invention.

Exemplary embodiments of the present invention will be described more fully hereinafter with reference to accompanying drawings. The present invention may, however, be embodied in different forms and should not be construed as limited to the embodiments set forth herein. Like reference numerals may refer to like elements throughout the specification. The sizes or proportions of elements illustrated in the drawings may be exaggerated for clarity.

In the specification, it will be understood that when a layer, a film, a region, or a plate is referred to as being 'on' another layer, region, or plate, it can be directly on the other layer, region, or plate, or intervening layers, regions, or plates may also be present therebetween.

FIG. 1 is a block diagram of a display device according to an exemplary embodiment of the present invention. FIGS. 2A, 2B, 2C, and 2D are perspective views illustrating a display device according to exemplary embodiments of the present invention.

Referring to FIGS. 1, 2A, 2B, 2C, and 2D, a display device 10, according to an exemplary embodiment of the present invention, includes a backlight unit BLU and a display panel DP disposed on the backlight unit BLU. The backlight unit BLU and the display panel DP may be laminated in a third direction DR3.

The display panel DP is disposed on the backlight unit BLU. The display panel DP receives light to display an image. The display panel DP may be a non-emissive display panel. The display panel DP may be, for example, a liquid crystal display panel, a plasma display panel, an electrophoretic display panel, a microelectromechanical system (MEMS) display panel, or an electrowetting display panel. In an exemplary embodiment of the present invention, the display panel DP is a liquid crystal display panel.

The liquid crystal display panel may be a vertical alignment (VA) mode panel, a patterned vertical alignment (PVA) mode panel, an in-plane switching (IPS) mode panel, a fringe-field switching (FFS) mode panel, or a plane to line switching (PLS) mode panel. However, it is understood that the liquid crystal display panel is not limited to the aforementioned types.

The backlight unit BLU provides light to the display panel DP. The backlight unit BLU may include a light source unit LU and an optical unit OU. The light source unit LU provides a first light L1 to the optical unit OU. For example, the light source unit LU may provide blue light. The light source unit LU may include at least one light source LS and a circuit board CB on which the light source LS is disposed. The circuit board CB may apply power to the light source LS. For example, the light source LS may be a light emitting diode (LED). The light source LS may be provided in plurality. The light sources LS may be disposed on the circuit board CB and be spaced apart from each other in a second direction DR2. For example, the light sources LS may provide blue light.

The optical unit OU receives the first light L1 from the light source unit LU to convert at least a portion of the first light L1 into second light L2 and third light L3, which have colors different from that of the first light L1. The optical unit OU may linearly polarize the converted light. For example, the first light L1 may be a blue light, second light L2 may be a green light, and the third light L3 may be a red light. The optical unit OU provides the first, second, and third light L1, L2, and L3 to the display panel DP.

The optical unit OU includes a bottom surface SF1 and a top surface SF2. The optical unit OU may receive the first light L1 from the light source unit LU from the bottom surface SF1 thereof. The top surface SF2 may be disposed closer to the display panel DP when compared to the bottom surface SF1. The optical unit OU may provide the first, second, and third lights L1, L2, and L3 from the top surface SF2 to the display panel DP. The optical unit OU will be described below in more detail.

The backlight unit BLU may further include an optical sheet OS. The optical sheet OS increases brightness and viewing angle of light provided from the display panel DP. The optical sheet OS may include a first optical sheet OS1, a second optical sheet OS2, and a third optical sheet OS3, which are successively laminated.

The first optical sheet OS1 may be a diffusion sheet for diffusing the light provided from the display panel DP. The second optical sheet OS2 may be a prism sheet that collects the light diffused by the diffusion sheet in a direction that is perpendicular to a plane on which the display panel DP is disposed. The third optical sheet OS3 may be a protective sheet for protecting the prism sheet from an external impact. A plurality of sheets of at least one first optical sheet OS1, one second optical sheet OS2, and one third optical sheet OS3 may overlap each other to form the optical member OS. When needed, one of the optical sheets included in the optical sheet OS may be omitted.

The display device 10, according to an exemplary embodiment of the present invention, may further include a bottom chassis. The bottom chassis may be disposed below the backlight unit BLU. The bottom chassis may accommodate components of the backlight unit BLU and the display panel DP.

The display device 10, according to an exemplary embodiment of the present invention, may further include a mold frame. The mold frame may be disposed between the display panel DP and the backlight unit BLU. The mold frame may be disposed along an edge of the display panel DP to support the display panel DP at a lower side of the display panel DP. The mold frame may be separated from the bottom chassis or may be integrated with the bottom chassis.

Figure 2A:
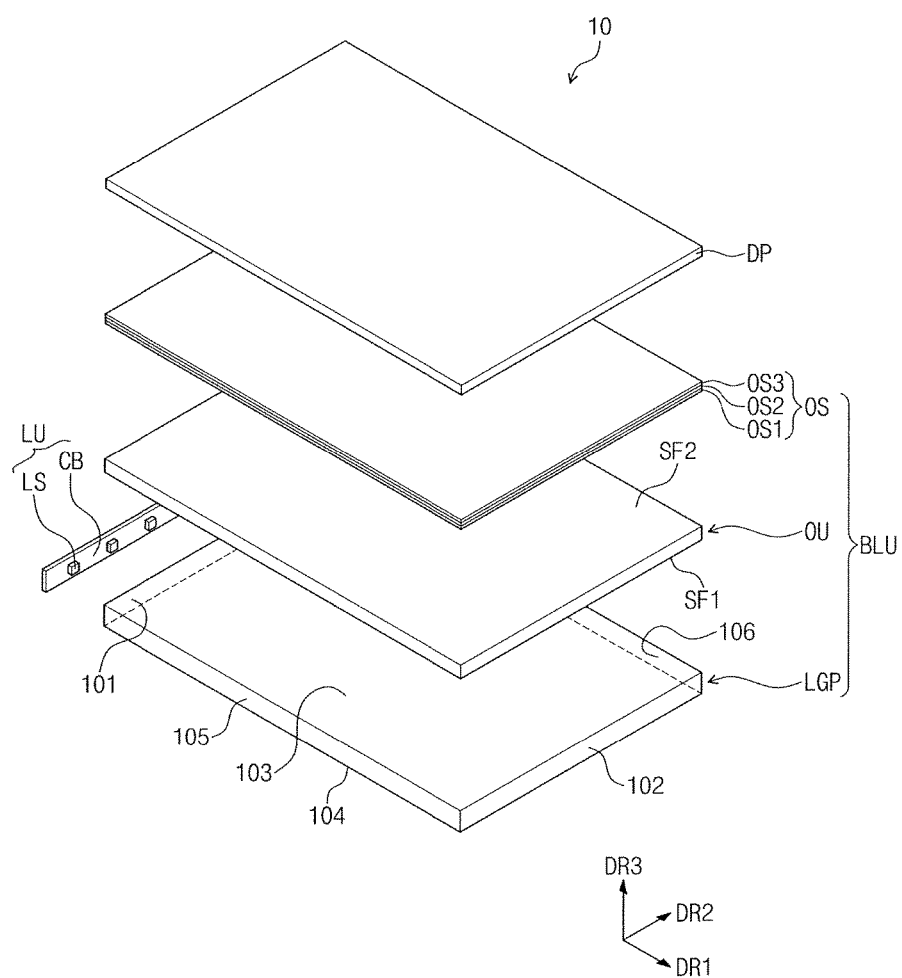
FIGS. 2A, 2B, 2C, and 2D are perspective views illustrating a display device according to exemplary embodiments of the present invention.
Figure 2B:
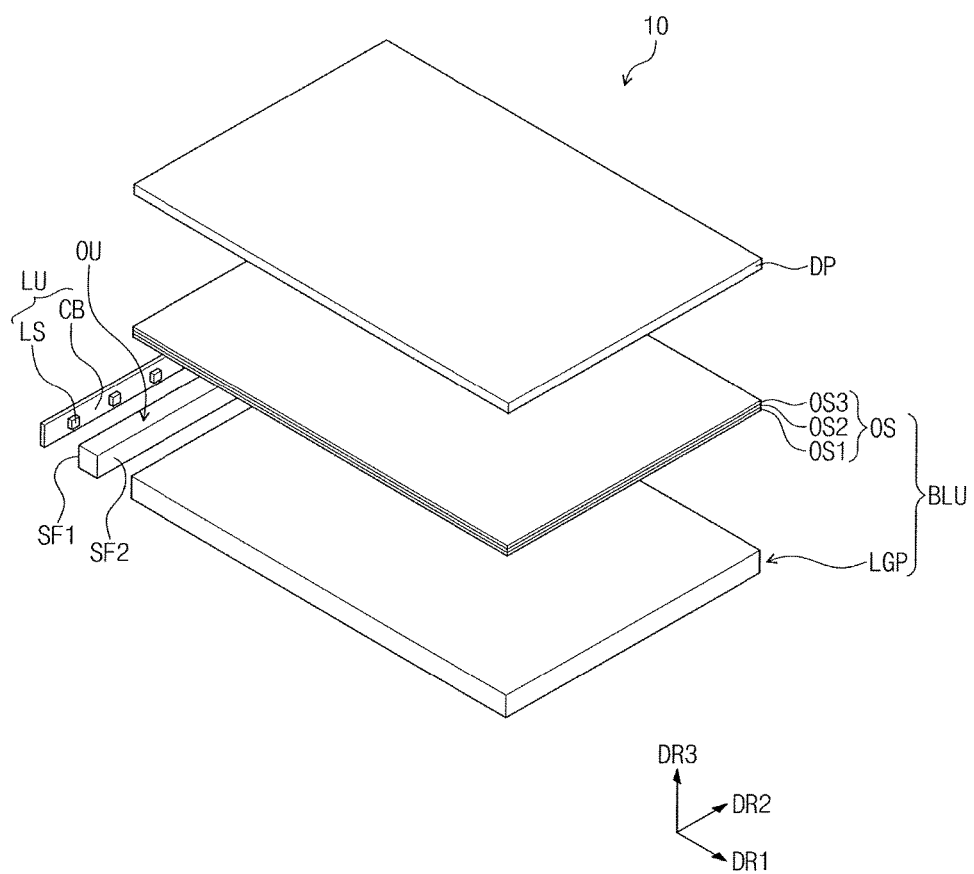

Referring to FIGS. 2A and 2B, a display device 10, according to an exemplary embodiment of the present invention, may include an edge-type light source unit. The backlight unit BLU may further include a light guide plate LGP. The light guide plate LGP may be disposed below the display panel DP.

The light guide plate LGP guides light provided from the light source unit LU to emit the received light. The light guide plate LGP may guide the light provided from the light source unit LU in a direction toward the display panel DP. The light incident into the light guide plate LGP is emitted in the direction toward the display panel DP through an emission surface 103 of the light guide plate LGP. The light guide plate LGP includes a light incident surface 101, an opposite surface 102, an emission surface 103, a rear surface 104, a first side surface 105, and a second side surface 106.

The light incident surface 101 receives light from the light source unit LU. The light incident surface 101 is disposed adjacent to the light source unit LU. The light incident surface 101 is connected to the emission surface 103, the rear surface 104, the first side surface 105, and the second side surface 106. The light incident surface 101 is opposite to the opposite surface 102.

The opposite surface 102 is opposite to the light incident surface 101. For example, the opposite surface 102 may be spaced apart from the light incident surface 101 in the first direction DR1. The opposite surface 102 is connected to the emission surface 103, the rear surface 104, the first side surface 105, and the second side surface 106.

The emission surface 103 emits the light provided from the incident surface 101. The emission surface 103 is disposed adjacent to the display panel DP. The emission surface 103 is connected to the light incident surface 101, the opposite surface 102, the first side surface 105, and the second side surface 106. The emission surface 103 is opposite to the rear surface 104.

The rear surface 104 is opposite to the emission surface 103. For example, the rear surface 104 may be spaced apart from the emission surface 103 in the third direction DR3. The rear surface 104 is connected to the light incident surface 101, the opposite surface 102, the first side surface 105, and the second side surface 106.

The first side surface 105 is connected to the light incident surface 101, the opposite surface 102, the emission surface 103, and the rear surface 104. The second side surface 106 is spaced apart from the first side surface 105 in the second direction DR2. The second side surface 106 is connected to the light incident surface 101, the opposite surface 102, the emission surface 103, and the rear surface 104.

The light guide plate LGP may include one or more materials which can provide the light incident to the light incident surface 101 to the display panel DP. For example, the light guide plate LGP may include a polymer resin or glass. For example, the polymer resin may be a transparent polymer resin such as polycarbonate, polymethyl methacrylate, polydimethylsiloxane, polystyrene, and methacrylate styrene.

The light guide plate LGP may include optical patterns. The optical patterns may reflect light. For example, the optical patterns may be disposed on at least one of the emission surface 103 and the rear surface 104 opposite to the emission surface 103.

The backlight unit BLU may further include a reflection sheet. The reflection sheet may be disposed below the light guide plate LGP. The reflection sheet may reflect light that that would otherwise not travel toward the display panel DP to travel toward the display panel DP. Thus, the reflection sheet increases an amount of light provided to the display panel DP.

Although the light source unit LU may be disposed on a side surface of the light guide plate LGP (e.g., on the light incident surface 101), which has a relatively short width, as shown in FIGS. 2A and 2B, the present invention is not limited thereto. For example, the light source unit LU may be disposed on a side surface of the light guide plate LGP which has a relatively large surface.

Although the light source unit LU may be disposed adjacent to only one of the side surfaces of the light guide plates LGP, as shown in FIGS. 2A and 2B, the present invention is not limited thereto. For example, a plurality of light source units LU may be disposed along two or more side surfaces of the light guide plate LGP.

Referring to FIG. 2A, the optical unit OU may be disposed between the light guide plate LGP and the display panel DP. The optical unit OU may be disposed on the emission surface 103 of the light guide plate LGP. The top surface SF2 of the optical unit OU may face the display panel DP, and the bottom surface SF1 of the optical unit OU may face the emission surface 103 of the light guide plate LGP.

Referring to FIG. 2B, the optical unit OU may be disposed between the light source unit LU and the light guide plate LGP. The top surface SF2 of the optical unit OU may face the light incident surface 101 of the light guide plate LGP, and the bottom surface SF1 of the optical unit OU may face the light source unit LU.

Figure 2C:
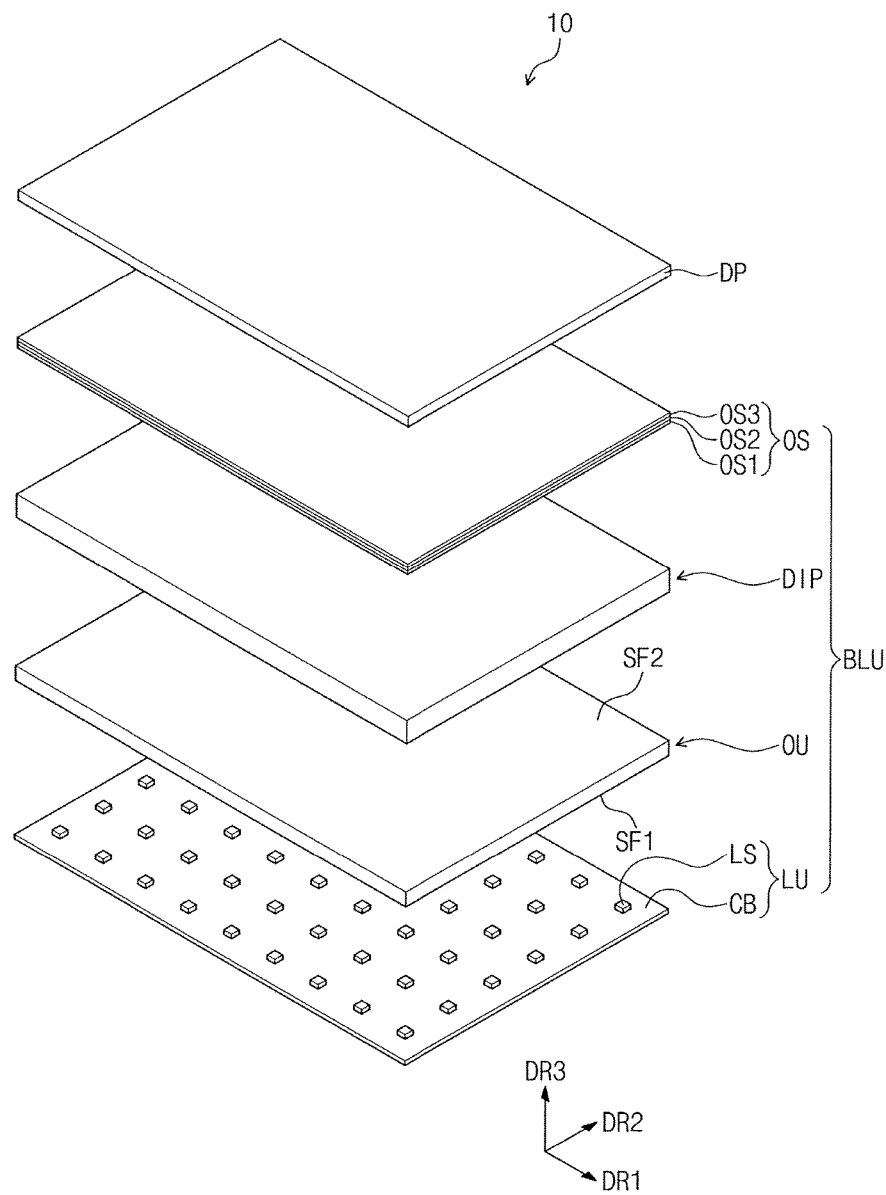
Figure 2D:
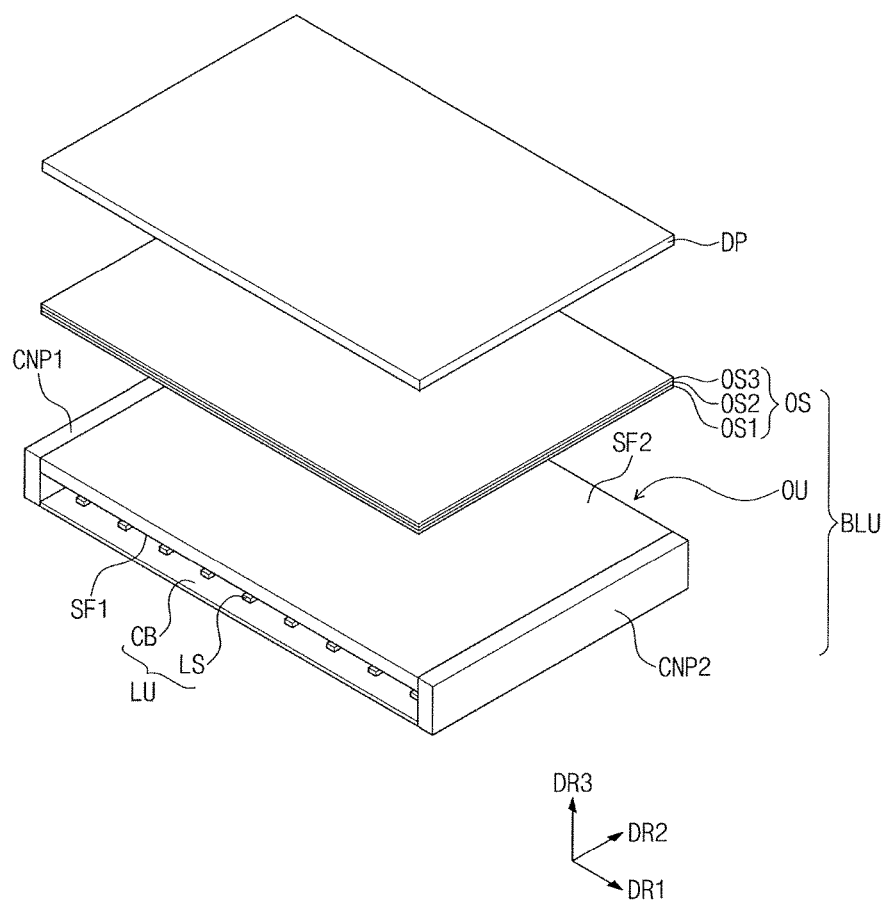

Referring to FIGS. 2C and 2D, a display device 10, according to an exemplary embodiment of the present invention, may include a direct-type light source unit LU.

Referring to FIG. 2C, the backlight unit BLU may further include a diffusion plate DIP. The diffusion plate DIP may receive light from the light source unit LU to provide the light to the display panel DP. The optical unit OU may be disposed between the diffusion plate DIP and the light source unit LU.

Referring to FIG. 2D, the diffusion plate DIP may be omitted. Also, the optical unit OU and the light source unit LU may be connected to each other. For example, the optical unit OU and the light source unit LU may be connected by connection parts CNP1 and CNP2. The connection parts CNP1 and CNP2 may include a first connection part CNP1 and a second connection part CNP2. A first side surface of the optical unit OU and a first side surface of the light source unit LU may be connected to the first connection part CNP1. A second side surface of the optical unit OU and a second side surface of the light source unit LU may be connected to the second connection part CNP2.

Figure 2E:
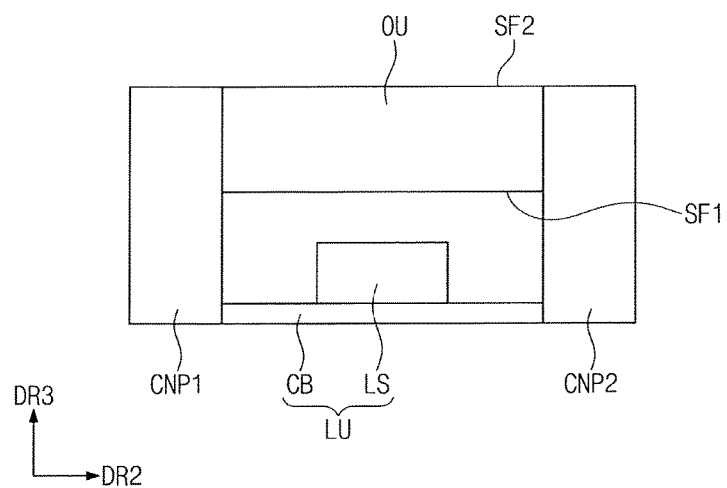
FIGS. 2E to 2F are cross-sectional views illustrating a structure in which an optical unit of a display device is connected to a light source unit, according to exemplary embodiments of the present invention.
Figure 2F:
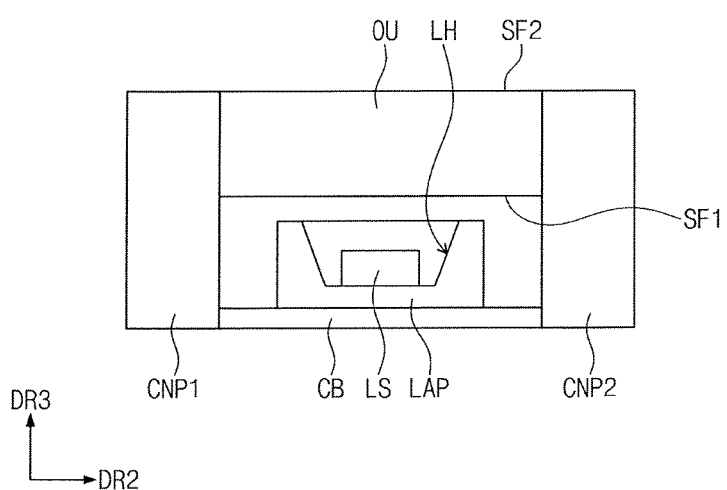

FIGS. 2E to 2F are cross-sectional views illustrating a structure in which an optical unit of a display device is connected to a light source unit, according to exemplary embodiments of the present invention.

Although the light source unit LU, including the plurality of light sources LS, may be connected to the optical unit OU, as shown in FIG. 2D, the present invention is not limited thereto. For example, as illustrated in FIGS. 2E and 2F, the light source unit LU, including one light source LS, may be connected to the optical unit OU. A display device 10, according to an exemplary embodiment of the present invention, may include one assembly in which the light source unit LU and the optical unit OU are connected to each other, as shown in of FIG. 2D. Alternatively, a display device 10, according to an exemplary embodiment of the present invention, may include a plurality of assemblies in which the light source unit LU and the optical unit OU of FIGS. 2E and 2F are connected to each other.

As illustrated in FIG. 2E, the light source unit LU may include a circuit board CB and a light source LS disposed on the circuit board CB to contact the circuit board CB. As illustrated in FIG. 2F, the light source unit LU may include a circuit board CB, a light source accommodation body LAP disposed on the circuit board CB, and a light source LS accommodated in the light source accommodation body LAP. The light source accommodation body LAP may include a light source accommodation groove LH, and the light source LS may be accommodated in the light source accommodation groove LH.

Figure 3A:
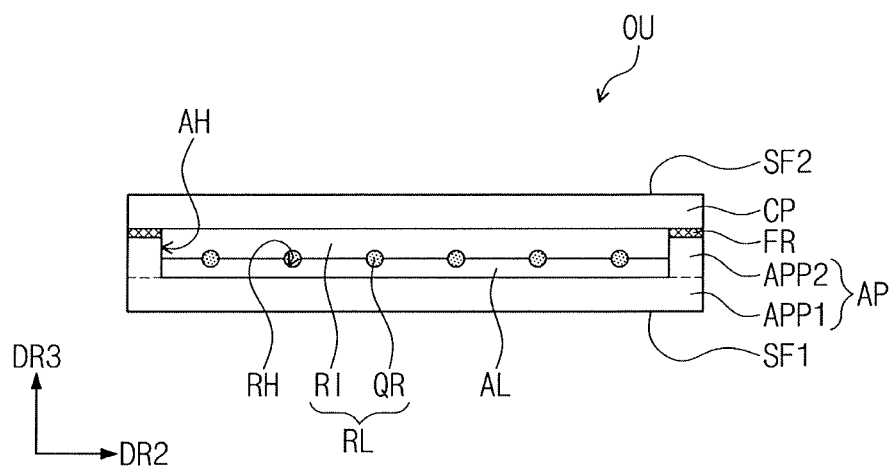
FIG. 3A is a cross-sectional view illustrating an optical unit of a display device according to an exemplary embodiment of the present invention.
Figure 3B:
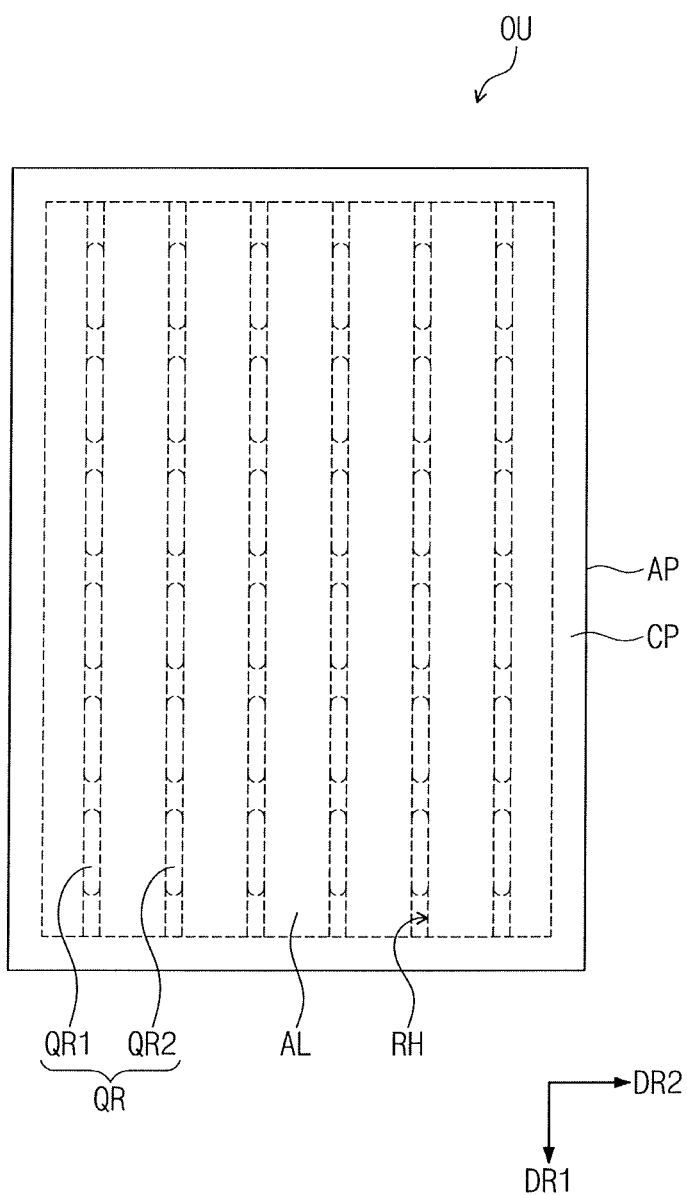
FIG. 3B is a plan view illustrating an optical unit of the display device according to an exemplary embodiment of the present invention.

FIG. 3A is a cross-sectional view illustrating an optical unit of a display device according to an exemplary embodiment of the present invention. FIG. 3B is a plan view illustrating an optical unit of the display device according to an exemplary embodiment of the present invention.

Referring to FIGS. 3A and 3B, the optical unit OU may include an alignment layer AL, quantum rods QR, and an accommodation part AP. The accommodation part AP accommodates the alignment layer AL and the quantum rods QR. The accommodation part AP includes a bottom portion APP1 and a side portion APP2. The side portion APP2 may be connected to the bottom portion APP1.

The accommodation part AP may have an accommodation groove AH. The alignment layer AL and the quantum rods QR may be accommodated in the accommodation groove AH. The accommodation groove AH may be defined by the bottom portion APP1 and the side portion APP2.

The accommodation part AP may be transparent. For example, the accommodation part AP may include glass or a polymer resin. For example, the polymer resin may include polyethylene terephthalate (PET), polyethylene naphthalate (PEN), polyimide, and/or polyether sulfone. However, it is understood that the accommodation part AP may include other transparent materials.

The alignment layer AL is accommodated in the accommodation part AP. The alignment layer AL may be accommodated in the accommodation groove AH. The alignment layer AL may be rubbed and include a plurality of alignment grooves RH that extend in the first direction DR1 and are spaced apart from each other in the second direction DR2, crossing the first direction DR1. However, the present invention is not limited thereto. For example, the alignment grooves RH may be spaced apart from each other in the first direction DR1 and extend in the second direction DR2. Although each of the alignment grooves RH may have a semicircular cross-sectional shape, as illustrated in FIG. 3B, the present invention is not limited thereto. For example, each of the alignment grooves RH may have an inverted triangular cross-sectional shape or other cross-sectional shapes.

The alignment layer AL may include polyimide, poly (amic acid), polyamide, poly(amic imide), polyester, polyethylene, polyurethane, and/or polystyrene.

A resin layer RL may be disposed on the alignment layer AL. The resin layer RL may include a resin RI and quantum rods QR. The resin RI may include a silicon resin or a photoresist resin. For example, the resin RI may include a monomer and/or an oligomer. The resin layer RL may further include an initiator, a dispersing agent, a deformer agent, and/or a scattering member.

The quantum rods QR may be aligned on the alignment layer AL. The quantum rods QR may be aligned in the alignment grooves RH. For example, the quantum rods QR may be aligned in the first direction DR1 and spaced apart from each other in the second direction DR2. However, the present invention is not limited thereto. For example, the quantum rods QR may be spaced apart from each other in the first direction DR1 and aligned in the second direction DR2. Although the quantum rods QR may be aligned in a direction parallel to the first direction DR1, as shown in FIG. 3B, the present invention is not limited thereto. For example, if a virtual line connecting weight centers of the quantum rods QR to each other is aligned in a direction that is approximately parallel to the first direction DR1, at least a portion of the quantum rods QR may be arranged to cross the first direction DR1.

The quantum rods QR include first quantum rods QR1 and second quantum rods QR2. For example, the first quantum rods QR1 may receive blue light to emit red light. For example, the second quantum rods QR2 may receive blue light to emit green light. The quantum rods QR will be described below in more detail.

A cover part CP may be disposed on the accommodation part AP. The cover part CP may be connected to the accommodation part AP by a fit FR. The cover part CP may have top and bottom surfaces, each of which is flat. However, the present invention is not limited thereto. For example, the cover part CP may also have a groove, like the accommodation part AP. The cover part CP covers the alignment layer AL and the quantum rods QR.

The cover part CP may be transparent. For example, the cover part CP may include glass or a polymer resin. For example, the polymer resin may include polyethylene terephthalate (PET), polyethylene naphthalate (PEN), polyimide, and/or polyether sulfone. However, the cover part CP may also include other transparent materials.

Figure 3C:
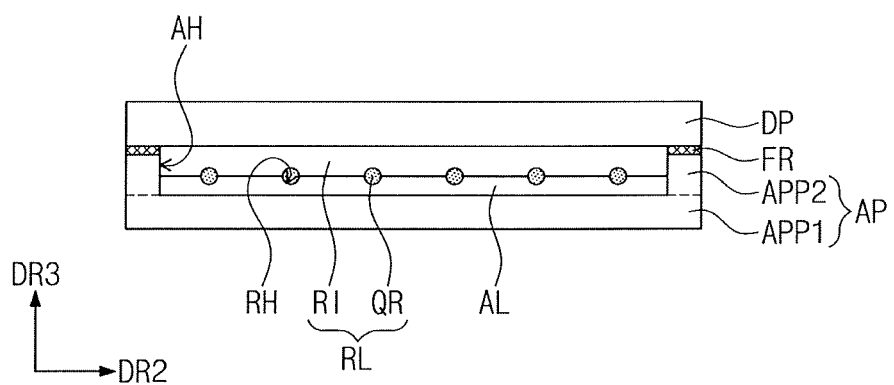
FIG. 3C is a cross-sectional view illustrating an optical unit of a display device according to an exemplary embodiment of the present invention.

FIG. 3C is a cross-sectional view illustrating an optical unit of a display device according to an exemplary embodiment of the present invention.

The fit FT connects the accommodation part AP to the cover part CP. However, the present invention is not limited thereto. For example, as illustrated in FIG. 3C, the frit FR may connect the accommodation part AP to the display panel DP. For example, the frit FR may have a rectangular ring shape on a plane. In an exemplary embodiment of the present invention, the fit FR may be disposed at the overlap between the cover part CP and the side portion APP2.

Although not shown in FIG. 3C, when the frit FR connects the accommodation part AP to the display panel DP, the optical sheet OS may be disposed between the resin layer RL and the display panel DP. In this case, at least one of the first optical sheet OS1, the second optical sheet OS2, and the third optical sheet OS3 may be omitted. A polarizer may be further disposed between the optical sheet OS of FIG. 2A and the display panel DP.

FIGS. 4A, 4B, 4C, 4D, and 4E are cross-sectional views illustrating a quantum rod of a display device according to exemplary embodiments of the present invention.

Each of the quantum rods QR may convert a wavelength band of light provided from the light source unit LU and may linearly polarize the light. Each of the quantum rods QR may absorb light having a predetermined wavelength band. The quantum rods QR, having absorbed light, may be in an excited state. Then, the quantum rods QR may return to a ground state to emit the absorbed optical energy.

For example, the quantum rods QR may be II-VI-based or III-V-based quantum rods. For example, the quantum rods QR may include a semiconductor such as a group II-VI semiconductor, a group IV-VI semiconductor, and/or a group IV semiconductor. For example, the quantum rods QR may include Si, Ge, Sn, Se, Te, B, C (including a diamond), P, BN, BP, BAs, AlN, AlP, AlAs, AlSb, GaN, GaP, GaAs, GaSb, InN, InP, InAs, InSb, AlN, AlP, AlAs, AlSb, GaN, GaP, GaAs, GaSb, ZnO, ZnS, ZnSe, ZnTe, CdS, CdSe, CdSeZn, CdTe, HgS, HgSe, HgTe, BeS, BeSe, BeTe, MgS, MgSe, GeS, GeSe, GeTe, SnS, SnSe, SnTe, PbO, PbS, PbSe, PbTe, CuF, CuCl, CuBr, CuI, $Si_3N_4$, $Ge_3N_4$, $Al_2O_3$, (Al, Ga, In)$_2$(S, Se, Te)$_3$, and/or $Al_2CO$.

The quantum rods QR may have different wavelength bands of excitation light according to a size of the quantum rods QR. For example, the excitation light of a quantum rod QR may be red, green, or blue, depending on the size of a quantum rod QR. However, the present invention is not limited thereto. For example, the quantum rods QR may have different wavelength bands of excitation light because a core and a shell of each of the quantum rods QR include materials different from each other.

Each of the quantum rods QR may have a long axis D1 and a short axis D2, crossing the long axis D1. Each of the quantum rods QR may include a core CR and a shell SH surrounding the core CR. The shell SH may have a long axis and a short axis crossing the long axis.

Figure 4A:
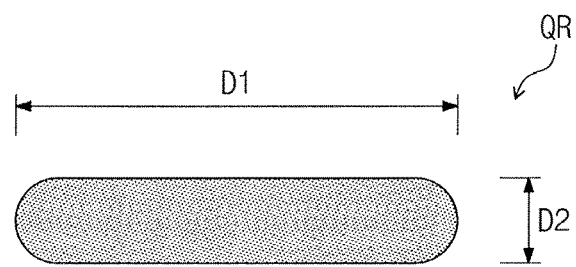
FIGS. 4A, 4B, 4C, 4D, and 4E are cross-sectional views illustrating a quantum rod of a display device according to exemplary embodiments of the present invention.
Figure 4B:
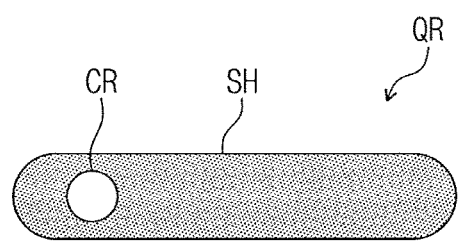
Figure 4C:
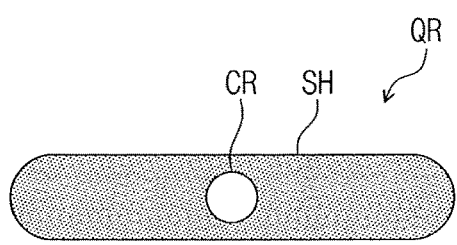
Figure 4D:
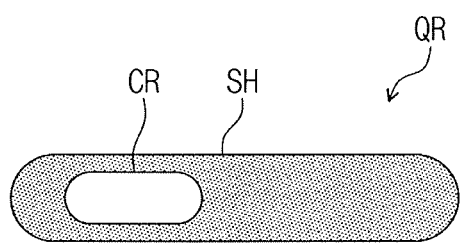
Figure 4E:
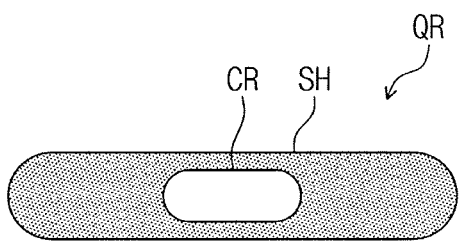

Referring to FIGS. 4B, 4C, 4D, and 4E, each of the core CR and the shell SH may have various shapes. For example, referring to FIGS. 4B and 4C, the core CR may have a globular shape (e.g., the core CR may be an elongated structure with rounded ends) and also a circular shape on a cross-section. For example, the core CR may be spherical or it may linearly extend and have round ends. Referring to FIG. 4B, the core CR may be disposed at a location that is moved (e.g., offset) from a center of the shell SH. Referring to FIG. 4C, the core CR may be disposed at the center of the shell SH. For example, referring to FIGS. 4D and 4E, each of the core CR and the shell SH may have a long axis and a short axis. Referring to FIG. 4D, the core CR may be disposed at a location that is moved from the center of the shell SH. Referring to FIG. 4E, the core CR may be disposed at the center of the shell SH.

A display device, according to an approach, may include an optical unit including quantum dots. When the optical unit includes the quantum dots, the quantum dots may be randomly disposed on a resin layer. In this case, the quantum dots may be exposed to moisture and oxygen. Thus, the quantum dots may have decreased reliability.

In addition, to increase the display quality of a display device using the optical unit which includes the quantum dots, a brightness-increasing film may be required in addition to the optical sheet. For example, a dual brightness enhancement film (DBFF) may be used as a brightness-increasing film. A display device, according to an approach, may be thick due to the presence of the brightness-increasing film.

In a display device 10, according to an exemplary embodiment of the present invention, the quantum rods QR may not be randomly disposed on the resin layer RL, but may be regularly disposed in the alignment grooves RH of the alignment layer AL. For example, the quantum rods QR may be disposed with their long axes along the alignment grooves RH. Thus, in an exemplary embodiment of the present invention, the probability of exposing the quantum rods QR to moisture, oxygen, and the like, may be reduced due to the quantum rods QR being sealed between the alignment grooves RH of the alignment layer AL and the resin RI.

In addition, a display device 10, according to an exemplary embodiment of the present invention, includes the optical unit OU, including the quantum rods QR that generate bright light, linearly polarized in the long axis D1 direction. The transmission efficiency of the polarized light from the optical unit OU to the display panel DP may be greater than the transmission efficiency of non-polarized light. Thus, a display device 10, according to an exemplary embodiment of the present invention, may have high display quality without having a brightness—increasing film. In addition, since the brightness-increasing film may be omitted, in an exemplary embodiment of the present invention, the display device 10 may also be thin and light.

Hereinafter, a method for fabricating a display device, according to an exemplary embodiment of the present invention, will be described.

Figure 5A:
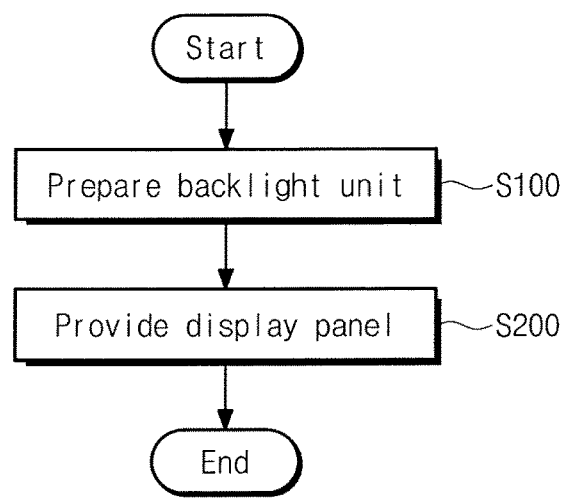
FIGS. 5A, 5B, and 5C are flowcharts illustrating a method for fabricating a display device according to an exemplary embodiment of the present invention.
Figure 5B:
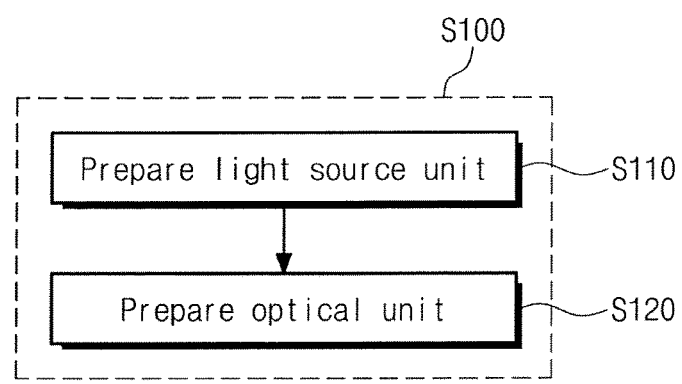
Figure 5C:
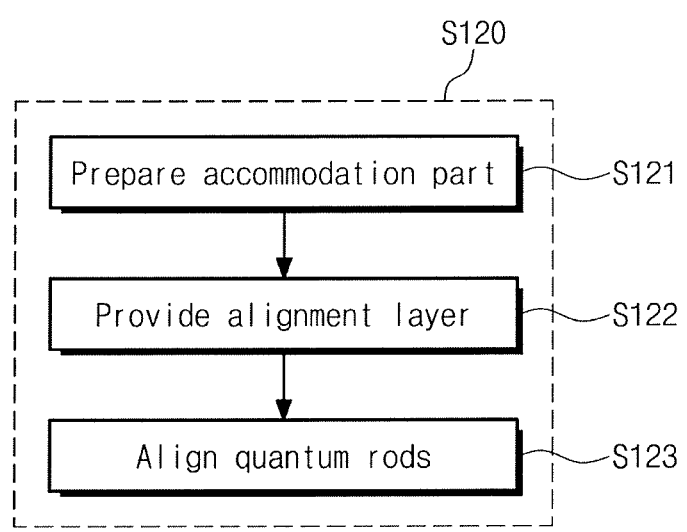
Figure 6A:
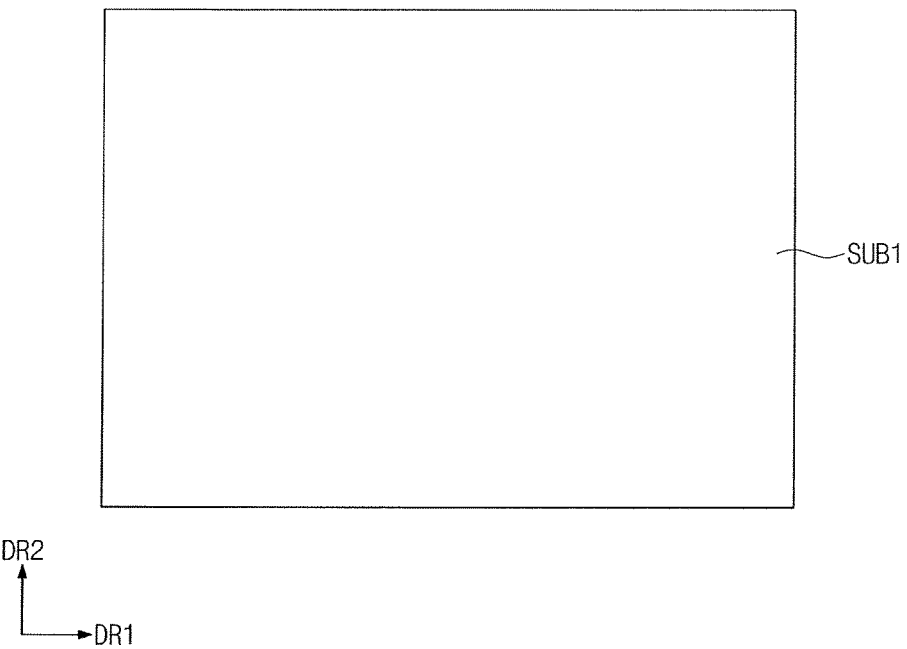
FIGS. 6A, 7A, 8A, 9A, 10A, 11A, and 12A are plan views sequentially illustrating a method for fabricating a display device according to an exemplary embodiment of the present invention.
Figure 6B:
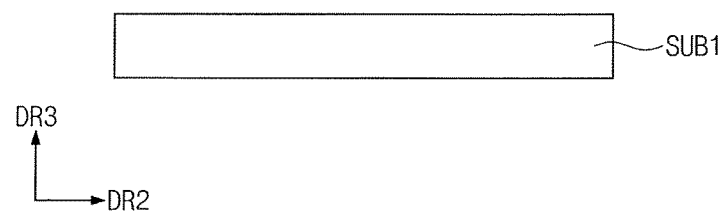
FIGS. 6B, 7B, 8B, 9B, 10B, 11B, and 12B are cross-sectional views sequentially illustrating a method for fabricating a display device according to an exemplary embodiment of the present invention.
Figure 7A:
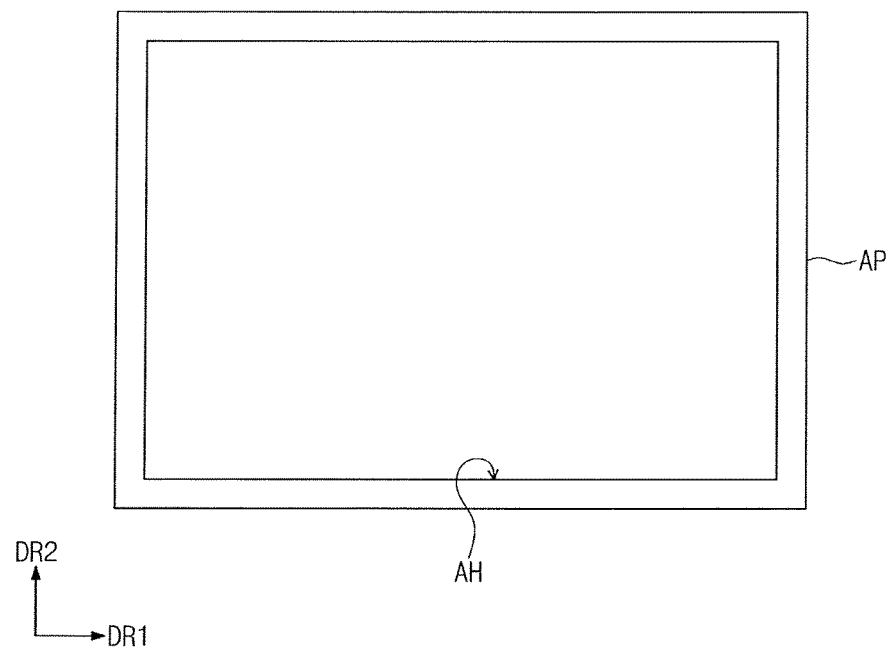
Figure 7B:
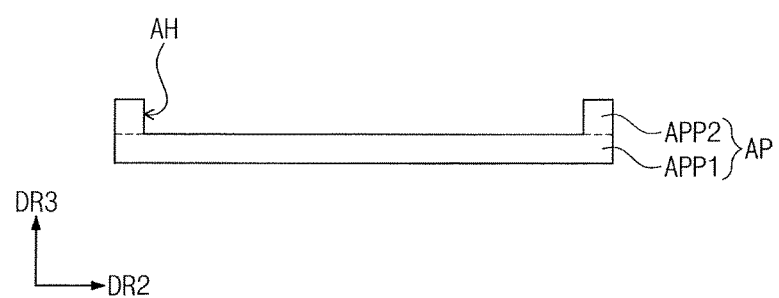
Figure 8A:
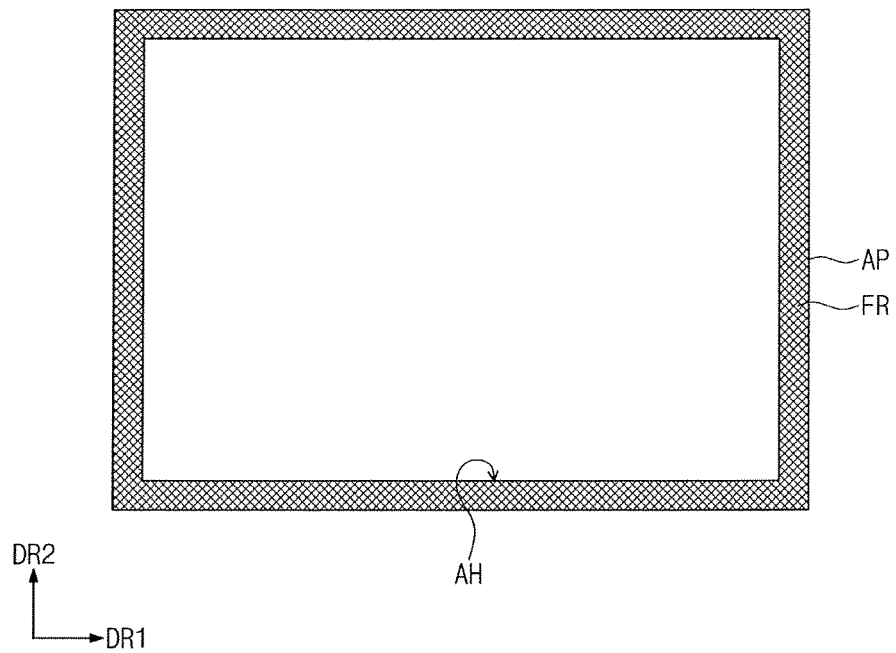
Figure 8B:
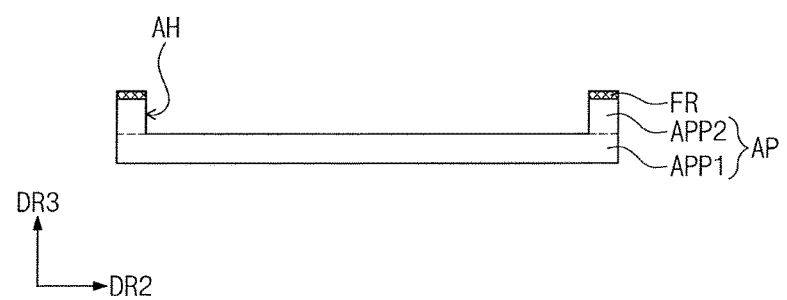
Figure 9A:
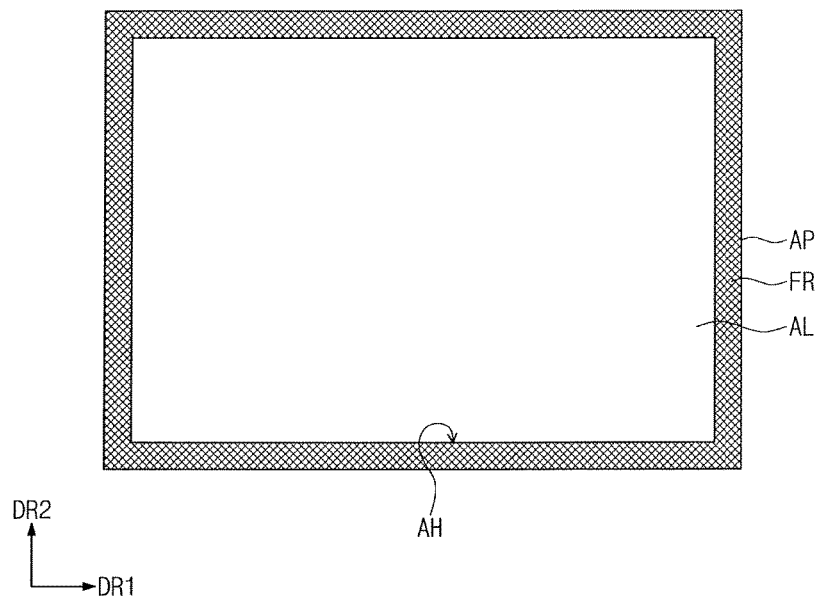
Figure 9B:
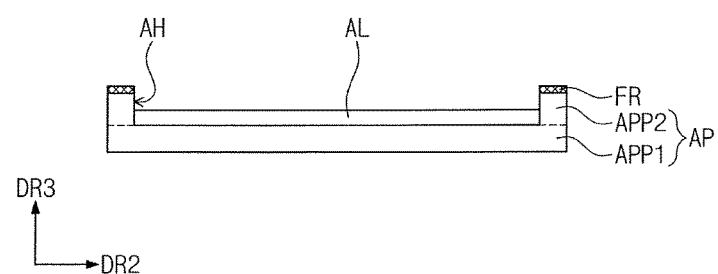
Figure 10A:
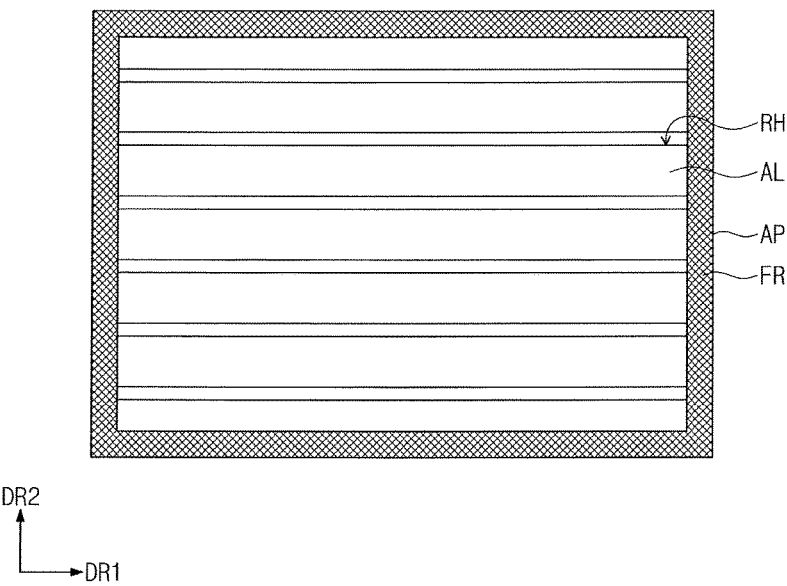
Figure 10B:
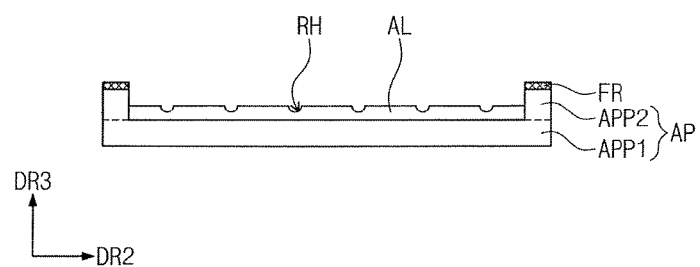
Figure 11A:
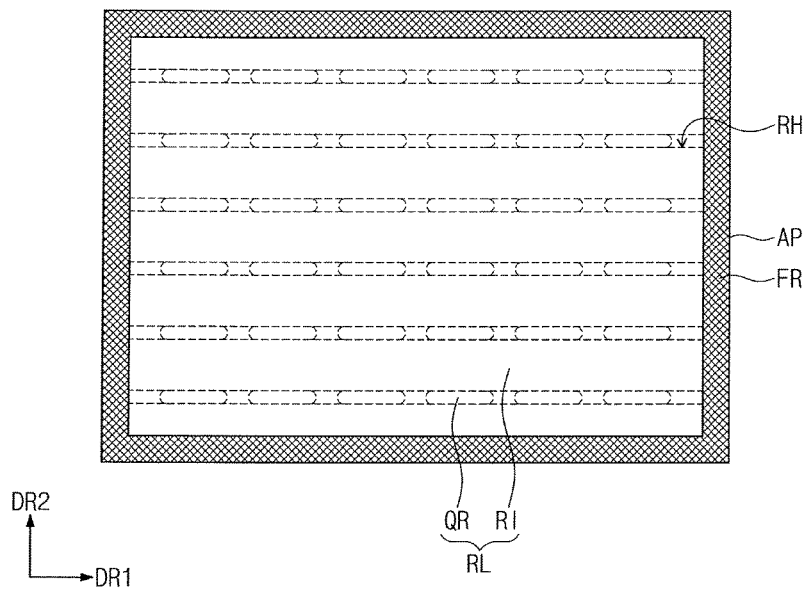
Figure 11B:
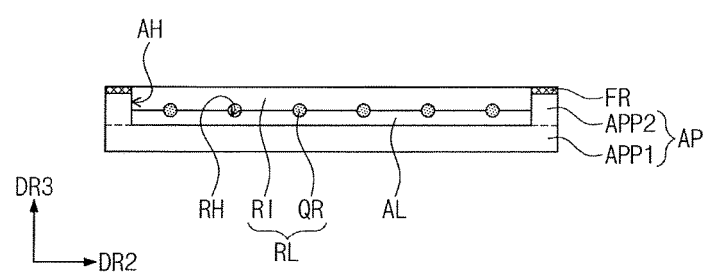
Figure 12A:
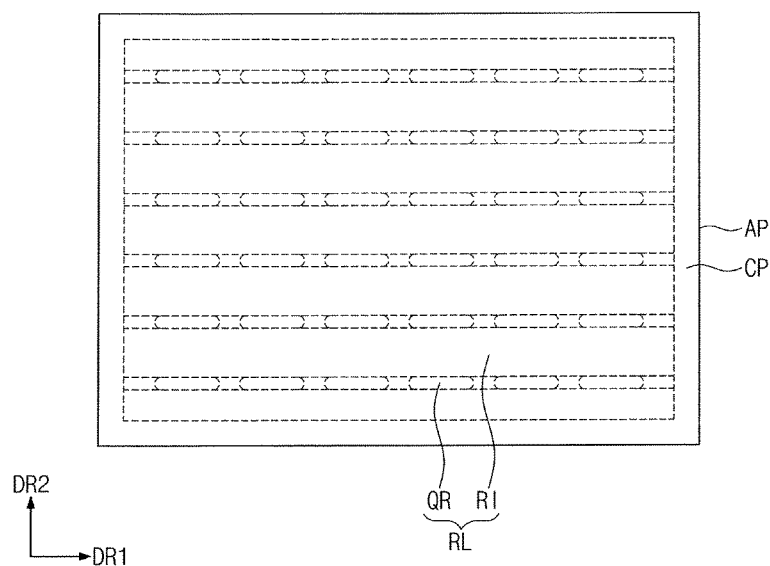
Figure 12B:
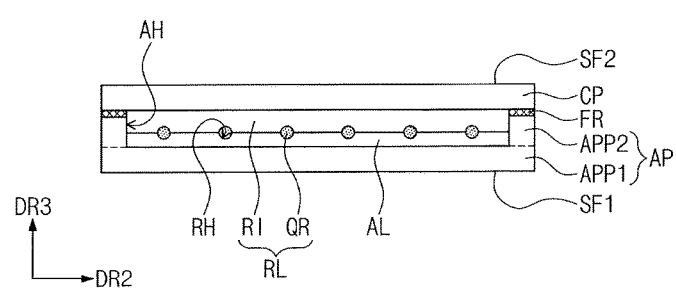

FIGS. 5A, 5B, and 5C are flowcharts illustrating a method for fabricating a display device according to an exemplary embodiment of the present invention. FIGS. 6A, 7A, 8A, 9A, 10A, 11A, and 12A are plan views sequentially illustrating a method for fabricating a display device according to an exemplary embodiment of the present invention. FIGS. 6B, 7B, 8B, 9B, 10B, 11B, and 12B are cross-sectional views sequentially illustrating a method for fabricating a display device according to an exemplary embodiment of the present invention.

Referring to FIGS. 1, 5A, 5B, 5C, 6A to 12A, and 6B to 12B, a method for fabricating the display device 10, according to an exemplary embodiment of the present invention, includes a process (S100) of preparing a backlight unit BLU and a process (S200) of providing a display panel DP on the backlight unit BLU. The process (S100) of preparing the backlight unit BLU includes a process (S110) of preparing a light source unit LU and a process (S120) of providing an optical unit OU between the light source unit LU and the display panel DP. The process (S120) of providing the optical unit OU includes a process (S121) of preparing an accommodation part AP, a process (S122) of providing an alignment layer AL in the accommodation part AP, and a process (S123) of aligning quantum rods QR on the alignment layer AL.

Referring to FIGS. 5A, 5B, 5C, 6A, and 6B, a base substrate SUB is prepared (e.g., formed). The base substrate SUB may have a rectangular shape on a plane. For example, the base substrate may include glass or a polymer resin. For example, the polymer resin may include polyethylene terephthalate (PET), polyethylene naphthalate (PEN), polyimide, and/or polyether sulfone.

Referring to FIGS. 5A, 5B, 5C, 7A, 7B, 8A, 8B, 9A, and 9B, the process (S200) of preparing the backlight unit BLU may further include a process of forming an accommodation groove AH in the accommodation part AP and a process of rubbing the alignment layer AL.

Referring to FIGS. 5A, 5B, 5C, 7A, and 7B, the accommodation part AP is prepared (e.g., formed) (S121). The accommodation part AP may have an accommodation groove AH. For example, the process of forming the accommodation groove AH in the accommodation part AP may include a process of etching a portion of the base substrate SUB corresponding to the accommodation groove AH to form the accommodation groove AH. The accommodation part AP includes a bottom portion APP1 and a side portion APP2. The side portion APP2 may be connected to the bottom portion APP1. The accommodation groove AH may be defined by the bottom portion APP1 and the side portion APP2.

Referring to FIGS. 5A, 5B, 5C, 8A, and 8B, the alignment layer AL is provided in the accommodation part AP (S122). For example, the alignment layer AL may include polyimide, poly(amic acid), polyamide, poly(amic imide), polyester, polyethylene, polyurethane, and/or polystyrene.

Referring to FIGS. 5A, 5B, 5C, 9A, and 9B, the alignment layer AL is rubbed. The alignment layer AL may be rubbed and include a plurality of alignment grooves RH that extend in the first direction DR1 and are spaced apart from each other in the second direction DR2, crossing the first direction DR1. However, the present invention is not limited thereto. For example, the alignment grooves RH may be spaced apart from each other in the first direction DR1 and extend in the second direction DR2.

Referring to FIGS. 5A, 5B, 5C, 10A, and 10B, a resin layer RL is provided on the alignment layer AL. The process of providing the resin layer RL on the alignment layer AL includes a process (S123) of aligning the quantum rods QR on the alignment layer AL.

The resin layer RL may include a resin RI and quantum rods QR. For example, the resin RI may include a silicon resin or a photoresist resin. For example, the resin RI may include a monomer and/or an oligomer. The resin layer RL may further include an initiator, a dispersing agent, a deformer agent, and/or a scattering member.

The quantum rods QR may be aligned on the alignment layer AL. The quantum rods QR may be aligned in the alignment grooves RH. For example, the quantum rods QR may be aligned in the first direction DR1 and spaced apart from each other in the second direction DR2. However, the present invention is not limited thereto. For example, the quantum rods QR may be spaced apart from each other in the first direction DR1 and aligned in the second direction DR2. When the quantum rods QR are aligned on the alignment layer AL, the resin layer RL may be cured by using ultraviolet rays (UV).

Referring to FIGS. 5A, 5B, 5C, 11A, 11B, 12A, and 12B, the process (S200) of preparing the backlight unit BLU may further include a process of providing a cover part CP on the accommodation part AP and a process of providing a frit FR, connecting the accommodation part AP to the cover part CP.

Referring to FIGS. 5A, 5B, 5C, 11A, and 11B, the frit FR is provided. The frit FT connects the accommodation part AP to the cover part CP. However, the present invention is not limited thereto. For example, the frit FR may connect the accommodation part AP to the display panel DP. For example, the fit FR may have a rectangular ring shape on a plane. The fit FR may be provided on an area except for the accommodation groove AH of the accommodation part AP. For example, the fit FR may be screen-printed on the accommodation part AP by using a mask. The frit FR provided on the accommodation part AP may be plastically cured.

Referring to FIGS. 5A, 5B, 5C, 12A, and 12B, the cover part CP may be provided on the accommodation part AP. A cover part CP may be disposed on the accommodation part AP. The cover part CP may be connected to the accommodation part AP by the fit FR.

The cover part CP may be transparent. For example, the cover part CP may include glass or a polymer resin. For example, the polymer resin may include polyethylene terephthalate (PET), polyethylene naphthalate (PEN), polyimide, and/or polyether sulfone.

A display device, according to an approach, may include an optical unit including quantum dots. When the optical unit includes the quantum dots, the quantum dots may be randomly disposed on a resin layer. In this case, the quantum dots may be exposed to moisture and oxygen. Thus, the quantum dots may have decreased reliability.

In addition, to increase the display quality of a display device using the optical unit which includes the quantum dots, a brightness-increasing film may be required in addition to the optical sheet. For example, a dual brightness enhancement film (DBFF) may be used as a brightness-increasing film. A display device, according to an approach, may be thick due to the presence of the brightness-increasing film.

In a display device 10, according to an exemplary embodiment of the present invention, the quantum rods QR may not be randomly disposed on the resin layer RL, but may be regularly disposed in the alignment grooves RH of the alignment layer AL. Thus, in an exemplary embodiment of the present invention, the probability of exposing the quantum rods QR to moisture, oxygen, and the like, may be reduced due to the quantum rods QR being sealed between the alignment grooves RH of the alignment layer AL and the resin RI.

In addition, a display device 10, fabricated according to an exemplary embodiment of the present invention, includes the optical unit OU, including the quantum rods QR that generate bright light, linearly polarized in the long axis D1 direction. The transmission efficiency of the polarized light from the optical unit OU to the display panel DP may be greater than the transmission efficiency of non-polarized light. Thus, a display device 10, according to an exemplary embodiment of the present invention, may have high display quality without having a brightness—increasing film. In addition, since the brightness-increasing film may be omitted, in an exemplary embodiment of the present invention, a display device 10 may also be thin and light.

In a display device 10 according to an exemplary embodiment of the present invention, the display quality may be increased, and the display device 10 may be slim.

In the method for fabricating a display device 10, according to an exemplary embodiment of the present invention, the display quality may be increased, and the display device 10 may be slim.

While the present invention has been particularly shown and described with reference to exemplary embodiments thereof, it will be apparent to those of ordinary skill in the art that various changes in form and detail may be made therein without departing from the spirit and scope of the present invention as defined by the following claims.

What is claimed is:

1. A display device, comprising:
   a backlight unit; and
   a display panel disposed on the backlight unit,
   wherein the backlight unit comprises:
      a light source unit; and
      an optical unit disposed between the light source unit and the display panel,
      wherein the optical unit comprises:
         an alignment layer;
         quantum rods disposed on the alignment layer, wherein each of the quantum rods has a long axis and a short axis crossing the long axis and the quantum rods are aligned using grooves in the alignment layer extending in a first direction corresponding to the long axis of each of the quantum rods, the grooves being spaced apart from each other in a second direction corresponding to the short axis of each of the quantum rods; and
         an accommodation part configured to accommodate the alignment layer and the quantum rods.

2. The display device of claim 1, wherein the accommodation part comprises an accommodation groove configured to accommodate the alignment layer and the quantum rods.

3. The display device of claim 2, wherein the accommodation part further comprises:
   a bottom portion; and
   a side portion connected to the bottom portion,
   wherein the accommodation groove is defined by the bottom portion and the side portion, and
   the alignment layer and the quantum rods are disposed on the bottom portion.

4. The display device of claim 1, wherein the optical unit further comprises:
   a cover part disposed on the accommodation part; and
   frit configured to connect the accommodation part to the cover part.

5. The display device of claim 1, wherein the light source unit emits blue light, and
   the quantum rods comprise:
   first quantum rods configured to receive the blue light and emit red light; and
   second quantum rods configured to receive the blue light and emit green light.

6. The display device of claim 1, wherein the backlight unit further comprises a light guide plate configured to receive light from the light source unit,
   the light source unit is disposed on a side surface of the light guide plate, and
   the optical unit is disposed between the light guide plate and the display panel.

7. The display device of claim 1, wherein the backlight unit further comprises a light guide plate configured to receive light from the light source unit,
   the light source unit is disposed on a side surface of the light guide plate, and
   the optical unit is disposed between the light source unit and the light guide plate.

8. The display device of claim 1, wherein the backlight unit further comprises a diffusion plate configured to receive light from the light source unit,
   the light source unit is disposed below the diffusion plate, and
   the optical unit is disposed between the light source unit and the diffusion plate.

9. The display device of claim 1, Wherein the light source unit comprises:
   a circuit board; and
   a light source disposed on the circuit hoard,
   the backlight unit further comprises a connection part connecting the circuit hoard to the optical unit, and
   the optical unit is disposed on the light source.

10. The display device of claim 1, wherein the optical unit further comprises frit configured to connect the accommodation part to the display panel.

11. The display device of claim 1, wherein each of the quantum rods comprises:
a core; and
a shell surrounding the core.

12. The display device of claim 1, wherein each of the quantum rods converts a wavelength band of light provided from the light source unit, and linearly polarizes the light.

13. A display device, comprising:
a backlight unit; and
a display panel disposed on the backlight unit,
wherein the backlight unit comprises:
a light source unit; and
an optical unit disposed between the light source unit and the display panel,
wherein the optical unit comprises:
an alignment layer having grooves extending in a first direction and aligned in the first direction, wherein the grooves are separated from each other in a second direction crossing the first direction;
quantum rods disposed on the grooves; and
an accommodation part storing the alignment layer and the quantum rods.

14. The display device of claim 13, wherein long axes of the grooves extend substantially parallel to the first direction.

15. The display device of claim 13, wherein the quantum rods comprise first quantum rods and second quantum rods, wherein the first quantum rods emit light of a first color when exposed to light of a second color, and the second quantum rods emit light of a third color when exposed to the light of the second color, wherein the first, second and third colors are different from each other, and the light source unit emits the light of the second color.

* * * * *